(12) United States Patent
Hussain

(10) Patent No.: US 9,097,140 B2
(45) Date of Patent: Aug. 4, 2015

(54) CAVITY VENTILATION

(75) Inventor: Zahid M. Hussain, Mickleover (GB)

(73) Assignee: ROLLS-ROYCE PLC, London (GB)

( * ) Notice: Subject to any disclaimer, the term of this patent is extended or adjusted under 35 U.S.C. 154(b) by 1488 days.

(21) Appl. No.: 12/591,151

(22) Filed: Nov. 10, 2009

(65) Prior Publication Data
US 2010/0146986 A1    Jun. 17, 2010

(30) Foreign Application Priority Data
Dec. 12, 2008    (GB) .................................... 0822639.1

(51) Int. Cl.
| F02K 3/02 | (2006.01) |
| F01D 25/14 | (2006.01) |
| F02K 3/06 | (2006.01) |
| F02C 7/18 | (2006.01) |

(52) U.S. Cl.
CPC . *F01D 25/14* (2013.01); *F02C 7/18* (2013.01); *F02K 3/06* (2013.01); *F05D 2260/2212* (2013.01); *F05D 2260/608* (2013.01); *Y02T 50/675* (2013.01)

(58) Field of Classification Search
CPC .............. F02C 7/12; F02C 7/125; F02C 7/16; F02C 7/18; F02C 7/24; F05D 2260/20; F02K 1/822; F01D 25/08; F01D 25/12; F01D 25/14; F01D 25/145; F01D 11/24
USPC ................. 60/226.1, 262, 263, 264, 806, 39.5
See application file for complete search history.

(56) References Cited

U.S. PATENT DOCUMENTS

| 6,122,892 A * | 9/2000 | Gonidec et al. ............... 52/793.1 |
| 2002/0005038 A1 | 1/2002 | Boeck |
| 2008/0112796 A1* | 5/2008 | Coney et al. .................. 415/115 |

(Continued)

FOREIGN PATENT DOCUMENTS

| EP | 1 004 759 A2 | 5/2000 |
| FR | 2 824 598 A1 | 11/2002 |

(Continued)

OTHER PUBLICATIONS

British Search Report conducted on Mar. 25, 2009 in corresponding British Patent Application No. 0822639.1.

(Continued)

*Primary Examiner* — Devon Kramer
*Assistant Examiner* — Vikansha Dwivedi
(74) *Attorney, Agent, or Firm* — Oliff PLC

(57) ABSTRACT

A ventilation arrangement for an annular cavity located about the core engine of a gas turbine, the annular cavity having an axis and an inner wall located about the axis and an outer wall radially spaced from the inner wall, the outer wall being interposed between the cavity and an engine bypass duct. The ventilation arrangement comprises a plurality of ventilation ducts passing through said outer wall and providing for fluid communication between the bypass duct and the cavity and a flow diverter arranged at an oblique angle to a radial alignment with said axis so as to induce in the ventilation flow from said ducts a vortical flow within the cavity about the inner wall such that said vortical flow has a vortex width of magnitude substantially equal to that of a diameter of the annular cavity. The ducts may be shaped to provide the flow diverter. The internal geometry of the ducts may provide for a sudden expansion to control the exit profile of the flow into the cavity.

17 Claims, 3 Drawing Sheets

(56) References Cited

U.S. PATENT DOCUMENTS

2012/0034068 A1* 2/2012 Hussain .................. 415/115
2014/0150436 A1* 6/2014 Eroglu et al. ............... 60/752

FOREIGN PATENT DOCUMENTS

| | | |
|---|---|---|
| FR | 2 896 276 A1 | 7/2007 |
| GB | 1182687 | 3/1970 |
| GB | 2 095 757 A | 10/1982 |
| GB | 2 272 025 A | 5/1994 |
| JP | 2004339980 | 5/2003 |
| WO | WO 2007/083027 A1 | 7/2007 |

OTHER PUBLICATIONS

Jun. 13, 2013 European Search Report issued in European Patent Application No. 09252617.

* cited by examiner

CAVITY VENTILATION

FIELD OF THE INVENTION

The present invention relates to a cavity ventilation system and more particularly, although not exclusively, to a ventilation system for cooling a cavity located about a heat source, such as, for example, a gas turbine engine.

BACKGROUND OF THE INVENTION

Ducted fan jet engines for aircraft applications have a core engine located within an engine casing or cowl. The engine fan blades and casing are further surrounded by a nacelle spaced from the casing to provide a bypass duct about the core engine through which compressed air is forced by the fan blades.

A cavity is defined between the engine casing and the nacelle. The difference in profile between the core engine and the nacelle results in a cavity of considerable volume, in which it is known to mount accessories such as sensors and electrical or electronic components so as to make efficient use of the available space.

The cavity in question may be referred to as the engine compartment or fire zone.

A gas turbine engine and, in particular, the combustors produce a significant amount of heat during use, which results in greatly elevated temperatures within the cavity. The accessories mounted within the cavity are heat sensitive to a greater or lesser extent and can be damaged or degraded at such prevailing operating temperatures. Whilst steps have been taken to produce accessories which can withstand such elevated temperatures without imminent failure, it is well-known that the increased temperatures can impact on the operational life of such components.

In view of the above problem, it is known to provide a ventilation system for the cavity by directing cooling air from the engine bypass onto the engine casing and/or components 28 mounted thereon. This is achieved by providing ventilation ducts which are radially oriented with respect to the engine axis so as to bleed bypass air into the cavity. Each duct typically enters into the cavity and may comprise a flow restriction at its exit so as to produce a fast flowing jet of air directed towards the relevant components on the engine casing with the aim of providing maximum cooling effect in the vicinity of the jet.

A number of jets are angularly spaced about the cavity such that a global direction of the ventilation flow within the cavity is axial towards the trailing or downstream end of the cavity where the ventilation flow exits the cavity into the engine exhaust.

The ventilation flow through the cavity represents a parasitic loss to the efficiency of the gas turbine engine, causing reduced engine thrust and increased fuel consumption.

It is an aim of the present invention to provide an improved cavity ventilation system, which can provide suitable cooling with improved efficiency.

SUMMARY OF THE INVENTION

According to one aspect of the present invention there is provided a ventilation arrangement for an annular cavity within a gas turbine engine, the annular cavity having an axis and an inner wall located about the axis and an outer wall radially spaced there-from, wherein the ventilation arrangement comprises a plurality of ventilation ducts passing through said outer wall and providing for communication of cooling fluid into the cavity, and a flow diverter arranged at an oblique angle to a radial alignment with said axis so as to induce in the ventilation flow from said ducts a vortical flow component about the inner wall.

The ventilation flow typically passes through the cavity between the inner and outer walls. The vortical flow may be centred about the inner wall and/or engine axis.

In one embodiment, the one or more duct is shaped to provide the flow diverter. The flow diverter may protrude into the cavity from the outer wall. The flow diverter may comprise an open end section of the ventilation duct which turns about an oblique angle away from a radial alignment with the axis.

In one embodiment the flow diverter is arranged to direct the flow from the ventilation ducts substantially tangentially of, or else away from, the cavity inner wall. The ventilation ducts and associated flow diverters may be arranged to direct coolant flow about the inner cavity wall in a manner so as to produce a vortical flow having a vortex width of magnitude substantially equal to the diameter of the annular cavity. This arrangement represents a departure from prior cavity cooling methodologies, for which high velocity jets direct cooling air at the casing.

A plurality of ventilation ducts may be angularly spaced about said outer wall. Each duct may have an associated flow diverter which promotes the vortical flow component. Each flow diverter promotes a vortical flow in the same orientation about the inner wall. Each flow diverter may be arranged to produce a corresponding jet emanating there-from in use, the jets being oriented to complement or promote the vortical flow in the cavity. In an alternative explanation, each flow diverter may be considered to promote a corresponding vortex and the vortices of each of the flow diverters overlap to create a global vortex about the inner wall within the cavity. This creates a more uniform temperature distribution throughout air in the cavity and serves to avoid the temperature gradients caused by jetting of coolant against hot surfaces. A more even flow profile downstream is thus created.

The, or each, duct may comprise a first duct section defining a first flow area within the duct and a second duct section downstream of said first section, the second duct section defining a flow area which is equal to or greater than said first flow area. The first and second duct sections may be spaced by an intermediate wall which may be substantially perpendicular to the flow direction. The first and second duct sections may be spaced by an intermediate wall so as to define a sudden expansion within the duct. The flow diverter may be located downstream of said intermediate wall.

Additionally or alternatively, the first and second duct sections may have substantially the same flow area and the intermediate wall may comprise an aperture therein which creates the sudden expansion.

An expansion cavity or region within the second duct section may be defined which can create choked flow conditions.

In one embodiment, a first and second set of ducts may be provided, the first set of ducts arranged to enter into the cavity upstream of the second set of ducts. The flow diverter may be provided with respect to the second set of ducts. One or more flow diverters may be located adjacent or integrally with the second set of ducts.

According to a second aspect of the present invention, there is provided a ventilation arrangement for an annular cavity located about the core engine of a gas turbine, the annular cavity having an inner wall located about the core engine and an outer wall radially spaced there-from, the outer wall being interposed between the cavity and an engine bypass duct, wherein each duct comprises a first duct section defining a first flow area within the duct and a second duct section defining a second flow area which is greater than said first flow area, the second duct section being located downstream of said first section and connected thereto by an intermediate wall so as to define a sudden expansion within the duct.

The arrangement may comprise a flow diverter arranged at an oblique angle to the outer wall so as to induce in the ventilation flow from said ducts a vortical flow component about the inner wall.

Any or any combination of the optional features defined with respect to the first aspect of the invention may also be applied to the second aspect.

BRIEF DESCRIPTION OF THE DRAWINGS

One or more working embodiments of the present invention are described in further detail below by way of example with reference to the accompanying drawings, of which.

DETAILED DESCRIPTION OF THE INVENTION

Figure 1:
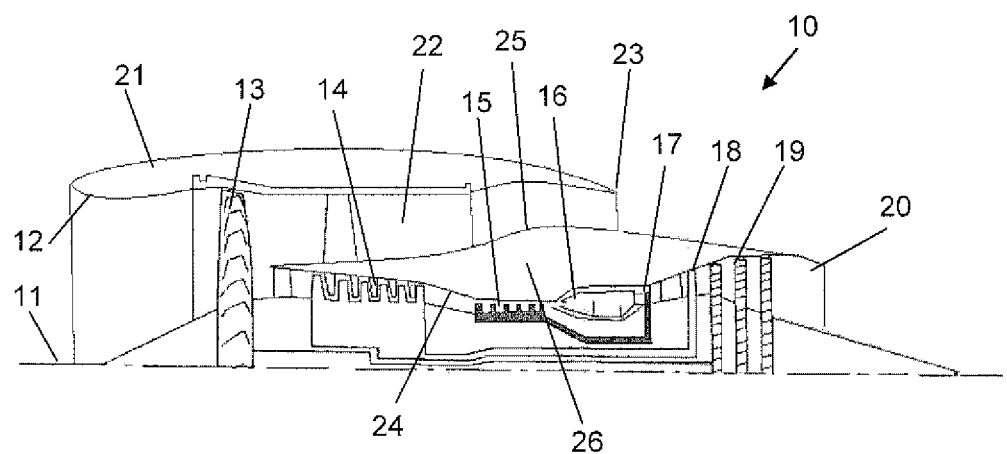
FIG. 1 shows a half longitudinal section of a general ducted fan gas turbine engine arrangement.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The core engine is closely surrounded by an inner casing 24. It can be seen in FIG. 1 that the profile of the engine core is different from that of the aerodynamic profile of the nacelle 21. Accordingly an outer casing or cowl 25 is provided around the engine to improve the aerodynamics of the engine. An internal volume 26, otherwise herein referred to as a cavity or compartment 26, is enclosed between the inner casing 24 and cowl 25. The cavity 26 is generally annular in section although the specific dimension and profile of the cavity may vary between engines based upon a number of design considerations. The cavity may be considered to have a minimum radius represented by the distance between the inner casing 24 and the axis 11. The cavity may be considered to have a maximum radius represented by the distance between the outer casing or cowl 25 and the axis 11. The mean cavity radius may be considered to be the distance between the mid-cavity and the axis 11. The cavity minimum, maximum and mean diameters may be construed accordingly. The cavity minimum and maximum diameters may be described as the distance between opposing points on the inner or outer casings respectively.

Whilst the description proceeds in relation to the cavity 26 located about the engine of a three-shaft turbofan engine, it will be appreciated to those skilled in the art that the invention may be applied to any format of gas turbine engine in which a cavity exists about the core engine, such as, for example a two-shaft engine.

Figure 2:
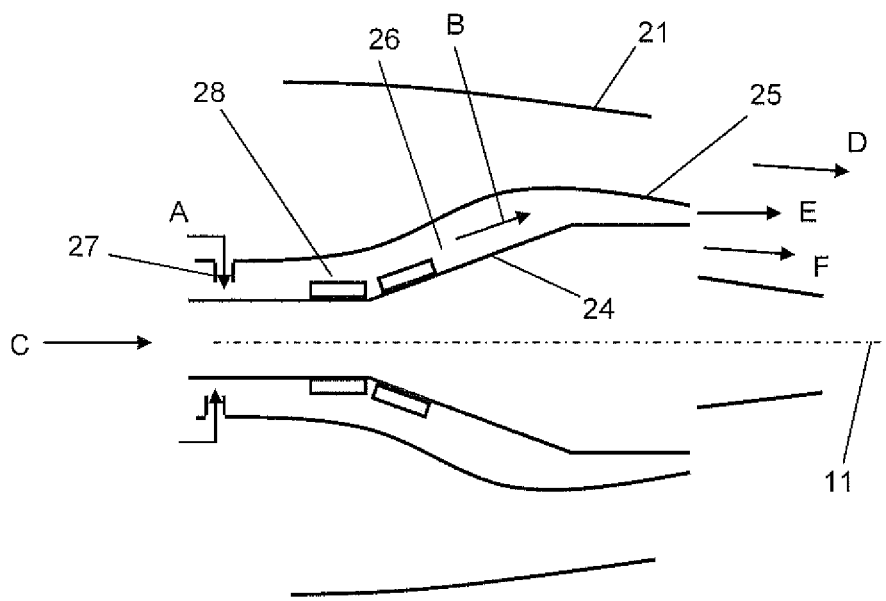
FIG. 2 shows a schematic longitudinal section of a cavity ventilation system according to the prior art.

Turning now to FIG. 2, there is shown a conventional cavity ventilation arrangement in which ducts 27 are provided to allow air to flow from the bypass 22 into the cavity 26. The ducts are oriented substantially radially relative to the axis 11 of the engine and so the cooling air impacts and cools the casing 24 and components 28 mounted thereon. The air enters the cavity in the direction of arrow A and passes rearward in an axial direction along the cavity as shown by arrow B prior to exiting the cavity at E, where the cooling airflow is entrained into the bypass flow D and/or engine exhaust flow F.

Figure 3:
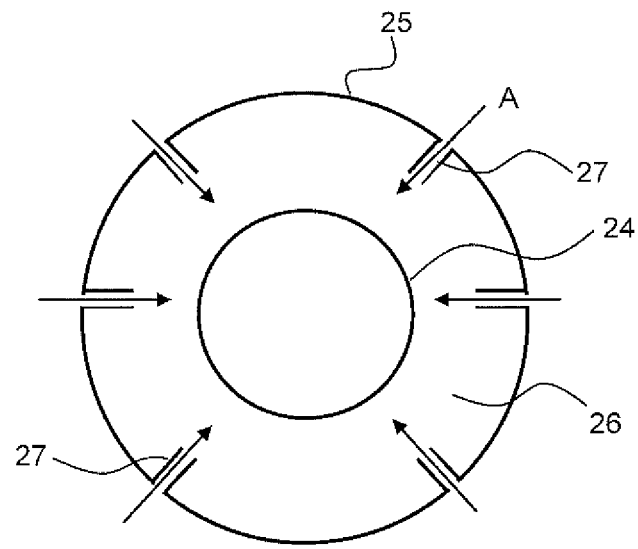
FIG. 3 shows a cross section of the arrangement of FIG. 2, taken through the centre of ducts 27.

FIG. 3 shows a section view of the arrangement of FIG. 2 taken through the centre of ducts A. As can be seen, the ducts A are angularly spaced about the casing 24 and are generally positioned at the same axial location along the cavity 26. The high velocity air bled from the bypass duct 22 results in high velocity ventilation jets entering cavity 26.

The present invention represents a departure from conventional thinking that the ventilation flow should be jetted at high velocity to increase cooling. Instead, the present invention proposes a reduction in the velocity and profile of the ventilation flow as it exits the ducts. Furthermore the present invention proposes to redirect the ventilation flow such that it achieves greater cooling efficiency and a more uniform cavity temperature profile across the cavity. Thus the present invention stems from a focus on the temperature of the cavity air itself, rather than the wall temperatures.

Figure 4:
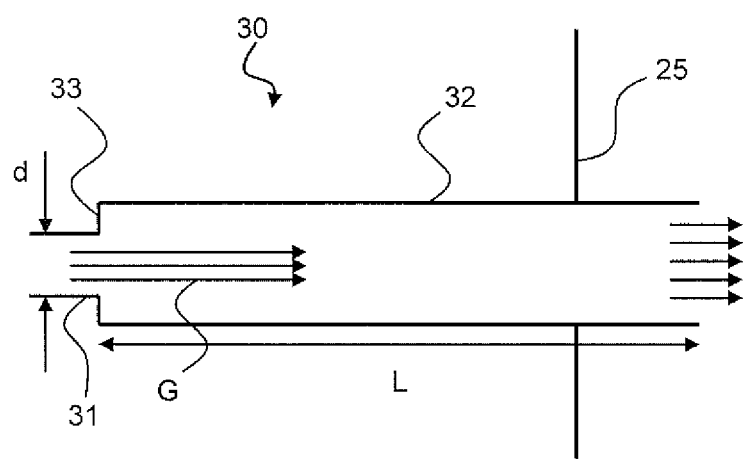
FIG. 4 shows a longitudinal section of an embodiment of a ventilation duct according to the present invention.

Turning to FIG. 4 there is shown one embodiment of a ducting arrangement for use in a ventilation system according to the present invention. The duct 30 passes from the bypass duct 22 into the cavity 26 so as to communicate a ventilation fluid—in this case, air—to the cavity. The engine fan 13 drives air through the bypass duct, thus providing a constant supply of air to the bypass duct 30.

The duct comprises a first section 31 of relatively narrow diameter 'd' and a second section 32 of relatively larger diameter. The second section 32 is downstream of the first section 31. An intermediate wall 33 is disposed around the first section 31 and joins the first and second sections. The peripheral wall 33 may be annular in shape and is typically arranged substantially perpendicular to the direction of flow through the duct, which is indicated by arrows G. The cross-sectional area of the duct increases from the first 31 to the second 32 section.

The first and second duct sections are typically curved in section and may be circular in, although other duct shapes and corresponding intermediate wall shapes are not excluded. The first duct section 31 represents a contraction into which fluid from the bypass duct is allowed to accelerate.

The intermediate wall 33 and difference in geometry between the first and second sections define a sudden expansion, which causes the fast moving inlet flow in the first duct section to decelerate within a relatively short distance compared to the free jet of the prior art.

The second duct section 32 passes from the intermediate wall 33 through the cowl 25 and protrudes a short distance into the cavity 26. The duct thus opens into the cavity 26 and the open end of the duct terminates in the interior of the cavity.

The sudden expansion within the duct slows the flow through the duct and thus reduces the impingement of the ventilation flow on the engine casing or any other hot structure. This has been found to reduce the amount of heat absorbed by the ventilation flow, which keeps the ventilation flow cooler as it passes through the cavity 26. Thus the space within the cavity is maintained at a lower temperature and so provides a better environment for accessories mounted within the zone. Accordingly the present invention seeks to avoid cooling of the casings. The sudden expansion produces slow moving flow into the ventilation zone, which is less aggressive in terms of heat transfer such that it is less prone to picking up heat energy from hot casings or components.

The sudden expansion within the duct may also be referred to as a dump diffuser. The sudden expansion creates a flow having a reduced Mach number at the exit end of the duct and a flatter exit velocity profile. The length of the second duct section 32 is typically between 5 and 10 times the diameter 'd' of the first pipe section 31. The diameter of the second duct section 32 may be anywhere between 1.5d and 3d. Accordingly, the ratio of flow areas between the first and second duct sections may be between 1:2.25 and 1:9.

It should be noted that a sudden expansion mixes out the flow to a less energetic state such that kinetic energy is dissipated within a shorter distance than by releasing a single jet into a very large cavity. The high velocity air mixes with the slow moving air of the sudden expansion cavity and the cavity wall acts on the fluid to promote mixing. Thus energy is dissipated by virtue of the turbulence induced by the presence of the sudden expansion.

In the example of a turbofan engine the operational flow rate through the cavity may be between 0.5 and 2.0 kg/s. The flow rate through each individual duct may be between 0.02 and 2 kg/s. Such parameters may vary dependent on the size and other operational requirements of the engine.

As an alternative to the example shown in FIG. 4, the first 31 and second 32 duct sections need not have different diameters. Instead, the first and second duct sections could have substantially the same diameter or flow area, with the intermediate wall 33 defining a flow restriction there-between. Thus the intermediate wall 33 may comprise an annular wall member located within a duct so as to define a sudden expansion therein. The annular wall would thus have an opening of diameter 'd' so as to produce a similar effect on the exit flow to the arrangement shown in FIG. 4.

In such an embodiment, the intermediate wall 33 may comprise a plate or disk formation. Such an embodiment has the advantage that the desired orifice can be formed simply within the plate, such as, for example, by drilling. The orifice plate can be located within a duct of substantially uniform cross-section such that more costly steps for producing bespoke duct profiles are avoided.

A further option, which may be used in conjunction with the embodiment of FIG. 4 or else the orifice plate arrangement, would be to provide a second duct section 32 which is divergent in shape. In such an embodiment, the duct wall would taper outwardly towards the duct exit. The angle of taper would preferably be less then 7° half angle in order to produce a lower exit Mach number profile which still carries sufficient energy to generate a suitable flow about the cavity as will be described in further detail below.

Figure 5:
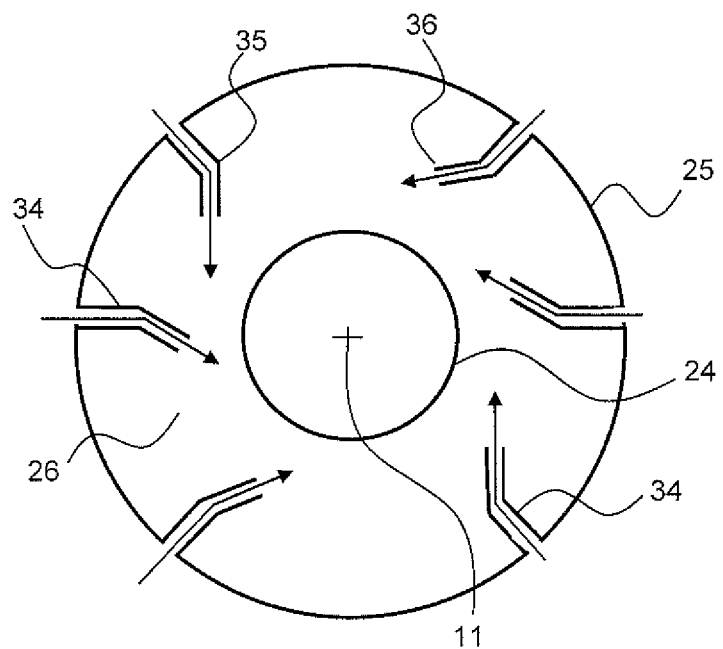
FIG. 5 shows a cross section of the arrangement of FIG. 4, taken through the centre of ducts 34 in FIG. 6; and, FIG. 6 shows a schematic longitudinal section of a cavity ventilation system according to one embodiment of the present invention.

Turning now to FIG. 5, it can be seen that a plurality of ducts 34 are provided at angularly spaced locations about the cowl 25. Each duct has an internal sudden expansion substantially as described above in relation to FIG. 4. Downstream of the sudden expansion, each duct is shaped such that it turns away from a radial alignment relative to the axis 11. In this embodiment, each duct 34 has a bend 35 therein which may be angular or curved in form.

The exit opening 36 of the ducts 34 is preferably offset from a radial alignment by an angle between 10° and 80° and more preferably between 20° and 60°. The optimum angle of offset from a radial alignment will be determined based upon the specific geometry of the cavity 26. However in one embodiment the flow exiting the ducts 34 is directed tangentially to, or else away from, the casing 24. The duct exit may thus be obliquely arranged relative to a radial line emanating from axis 11.

The advantages which may be achieved by orienting the ducts 34 in this manner can be considered to be threefold. Firstly, the flow avoids direct impingement on the engine casing so as reduce the amount of heat energy absorbed by the ventilation flow from the hot casing.

Secondly, the flow is arranged to produce a swirling motion and thus create a vortex within the cavity about the casing 24. The vorticity and the associated centrifugal force within the flow serve to urge the denser, cooler air away from the engine casing and the less dense, hotter air near the casings.

Thirdly, the path length for the air as it passes from the ducts 34 to the cavity exit is elongated due to the spiral nature of the path. This swirling nature of the flow can thus help to provide a more even cavity temperature profile. This is in contrast to the jetting arrangement of the prior art which can lead to discrete hot zones between the individual jets.

Figure 6:
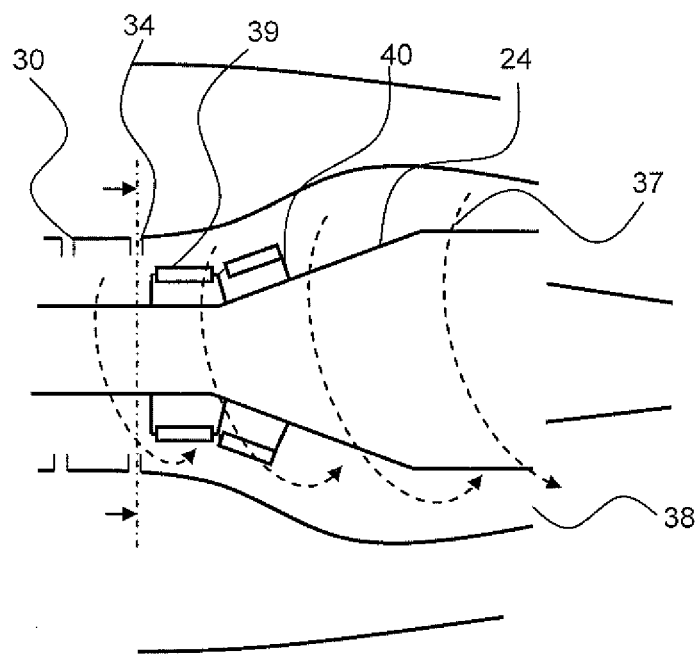

The nature of the path of the ventilation flow according to one embodiment of the present invention is shown in FIG. 6. The general direction of the flow path of the cooling air is shown by dashed lines 37. The vortical characteristic of the flow is such that the cooling air will make at least one complete revolution about the casing 24 in a global sense prior to exiting the cavity through aft-facing aperture 38. Thus the flow path is generally helical. However it will be appreciated that the presence of components and other features mounted to the casing 24 will cause disturbances to the global flow such that regions of recirculation exist for which global flow characteristics will not apply.

The exit aperture 38 may comprise an annular opening or else one or more individual apertures angularly spaced about the axis 11 and located so as to allow the cavity ventilation flow to be entrained into the bypass flow and/or core exhaust flow. Preferably the exit aperture 38 is disposed radially between the bypass duct 22 and the core exhaust flow such that the cavity ventilation flow is introduced into the bypass flow slightly upstream of the exhaust nozzle exit. The skilled person will appreciate that the exact location of the cavity exit aperture will be dependent on the engine and nacelle configuration.

One particular arrangement of cavity ventilation ducts is shown in FIG. 6. The arrangement comprises a first upstream set of ducts 30 and a second downstream set of ducts 34. The first and second sets of ducts are axially spaced and each set comprises a plurality of ducts angularly spaced about casing 24.

The first set of ducts 30 take the form substantially as shown in FIG. 4 such that air is directed into the cavity in a substantially radial alignment. This is in part due to space constraints at the leading end of the cavity 26 and also since the casing at this region of the cavity is significantly cooler than the casing further downstream in the vicinity of the combustion chamber(s) 16. Thus maximum cooling efficiency is not crucial in this region of the cavity. Despite being radially aligned, the air entering the cavity via ducts 30 mixes out with air in the cavity more efficiently than the jets of the prior art and thus heat transfer due to impingement on the casing can be reduced.

The second set of ducts 34 are as shown in FIG. 5 such that the rotation of the flow about the casing is induced by ducts 34. Providing only a number of turning ducts 34 out of the total number of ducts has been found to induce a sufficient vortex to the flow to achieve the advantages described above. The casing dimensions in the vicinity of ducts 34 provide greater space in which to induce a beneficial swirl to the ventilation flow. It is possible that a the duct 34 could be straight in profile and could terminate at or close to the outer cavity wall 25, such that a baffle could be mounted in the vicinity of the duct exit to induce a vortical component to the flow. Additionally or alternatively, one or more turning vanes could be mounted to the outer cavity wall 25 to induce a vortical flow component. However it is felt that space and cost constraints favour the shaping of the ducts 34 themselves to achieve the proposed flow conditions.

Also shown in FIG. 6 is a proposed mounting arrangement for temperature sensitive components mounted in the cavity 26. The components 39 for which cooling is more critical can be located further away from the casings in the denser, radially outer cooler air. This can be achieved by providing mounting formations 40 which space the components 39 from the casing 24. In this respect, the hotter air adjacent the casing 24 will tend to pass beneath the components, providing a degree of thermal insulation between the components 39 and the casing 24.

The mounting formations 40 may comprise mounting brackets for 'rafting' of the components. Components which are sensitive to temperature may be mounted such that they are held at least 100 mm off the surface of the casing, especially in the region of the combustor casing where the thermal environment is typically the most extreme. It is also important to note that in the vicinity of the combustor casing, thermal radiation is a significant problem and so the mounting formations may comprise radiation shielding, which may be integrated into the rafting structure to protect the component. The specific arrangement and dimensions thereof is subject to tuning to accommodate the variable operational characteristics of the cavity to be cooled.

The result of the above-described ventilation arrangement is that a more uniform temperature distribution is achieved about the casing, with the air temperature being greatest towards the casing 25 and decreasing with radial distance there-from.

The invention claimed is:

1. A ventilation arrangement for a substantially annular cavity located about a core engine of a gas turbine, the annular cavity having an inner wall located about the core engine and an outer wall radially spaced from the inner wall, the outer wall being interposed between the cavity and an engine bypass duct, the ventilation arrangement comprising:

one or more ventilation ducts passing through said outer wall so as to allow fluid communication between the bypass duct and the cavity; and, a flow diverter arranged at an oblique angle to the outer wall, the flow diverter having a flow exit opening that is separated from the outer wall such that the flow diverter is configured to induce, in the ventilation flow from the ventilation ducts, a vortical flow within the cavity about the inner wall, the vortical flow having a vortex width of magnitude substantially equal to that of a diameter of the annular cavity.

2. The ventilation arrangement according to claim 1, wherein the flow diverter protrudes into the cavity from the outer wall.

3. The ventilation arrangement according to claim 1, wherein the flow diverter comprises an open end section of the ventilation duct that bends at the oblique angle away from a radial alignment.

4. The ventilation arrangement according to claim 3, wherein the oblique angle at which the ventilation duct bends away from the radial alignment is between 10° and 80°.

5. The ventilation arrangement according to claim 3, wherein the oblique angle at which the ventilation duct bends away from the radial alignment is between 20° and 60°.

6. The ventilation arrangement according to claim 1, wherein the flow diverter is arranged to direct the flow from the ventilation duct substantially tangentially of, or else away from, the cavity inner wall.

7. The ventilation arrangement according to claim 1, wherein the ventilation ducts are angularly spaced about an axis, each duct having an associated flow diverter which promotes the vortical flow component in the same sense as the other flow diverters such that the combined flow components promote said vortical flow.

8. The ventilation arrangement according to claim 1, wherein each duct has an opening into the cavity and a formation arranged to reduce the energetic state of the flow through the duct upstream of the opening.

9. The ventilation arrangement according to claim 8, wherein the formation comprises an internal wall shaped to create a sudden expansion within the ventilation duct.

10. The ventilation arrangement according to claim 1, wherein each ventilation duct comprises a first duct section defining a first flow area within the ventilation duct and a second duct section downstream of said first section, the second duct section defining a flow area which is greater than said first flow area.

11. The ventilation arrangement according to claim 10, wherein the first and the second duct sections are spaced by an intermediate wall which is substantially perpendicular to the flow direction.

12. The ventilation arrangement according to claim 11, wherein the flow diverter is located downstream of said intermediate wall.

13. The ventilation arrangement according to claim 10, wherein a length of the second duct section is five to ten times the diameter of the first duct section.

14. The ventilation arrangement according to claim 10, wherein the flow area of the second duct section is 1.5 times the flow area of the first duct section or greater.

15. The ventilation arrangement according to claim 1, comprising a first set of ventilation ducts which enter into the cavity upstream of a second set of ventilation ducts, each of the second set of ventilation ducts comprising the flow diverter, so inducing a vortical flow within the cavity about the inner wall.

16. The ventilation arrangement according to claim 1, further comprising an exit aperture, the exit aperture having one or more individual apertures angularly spaced about the axis and located so as to allow the cavity ventilation flow to be entrained into the bypass flow and/or core exhaust flow.

17. The ventilation arrangement according to claim 1, wherein components are spaced from the inner wall so hotter air adjacent the casing passes beneath the components, and the components are within the vortical flow.

* * * * *